United States Patent
Kim

(10) Patent No.: US 8,110,263 B2
(45) Date of Patent: Feb. 7, 2012

(54) DOUBLE PACKING MATERIALS FOR INFUSION SOLUTION

(75) Inventor: Boo Geun Kim, Seoul (KR)

(73) Assignee: Central Medical Service Co., Ltd. (KR)

( * ) Notice: Subject to any disclaimer, the term of this patent is extended or adjusted under 35 U.S.C. 154(b) by 0 days.

(21) Appl. No.: 12/738,451

(22) PCT Filed: Oct. 15, 2008

(86) PCT No.: PCT/KR2008/006062
§ 371 (c)(1),
(2), (4) Date: Apr. 16, 2010

(87) PCT Pub. No.: WO2009/051391
PCT Pub. Date: Apr. 23, 2009

(65) Prior Publication Data
US 2010/0213091 A1   Aug. 26, 2010

(30) Foreign Application Priority Data

Oct. 16, 2007  (KR) .................. 10-2007-0104051

(51) Int. Cl.
*B29D 22/00* (2006.01)
*B65D 75/00* (2006.01)

(52) U.S. Cl. .............. 428/35.7; 206/438; 206/484.2; 428/35.9; 428/36.9; 604/410

(58) Field of Classification Search .......... 206/438, 206/439, 484, 484.1, 484.2, 528; 604/409, 604/410, 416, 408; 428/35.7, 35.9, 36.6, 428/36.9, 349, 458, 461, 462, 516
See application file for complete search history.

(56) References Cited

U.S. PATENT DOCUMENTS

| | | | | |
|---|---|---|---|---|
| 4,872,553 A | * | 10/1989 | Suzuki et al. | 206/524.4 |
| 4,998,400 A | * | 3/1991 | Suzuki et al. | 53/425 |
| 5,423,421 A | * | 6/1995 | Inoue et al. | 206/219 |
| 5,458,244 A | * | 10/1995 | Emori | 206/484.1 |
| 6,007,529 A | * | 12/1999 | Gustafsson et al. | 604/410 |
| 2002/0176952 A1 | | 11/2002 | Yasaka et al. | |

FOREIGN PATENT DOCUMENTS

| | | |
|---|---|---|
| JP | 2002-095721 | 4/2002 |
| JP | 2005-000677 | 1/2005 |

OTHER PUBLICATIONS

International Search Report—PCT/KR2008/006062 dated May 25, 2009.

* cited by examiner

*Primary Examiner* — Luan K Bui
(74) *Attorney, Agent, or Firm* — Cantor Colburn LLP

(57) ABSTRACT

The double packing materials according to the present invention which primarily packs the infusion solution with a polypropylene packing material and secondarily vacuum packs and hermetically seals the packed polyethylene packing material with a material including an aluminum foil ensures safety of the content therein from light and has high thermal resistance and excellent preservation properties that resists to the damage and tearing by external force on long-term storage despite that it is not stored in dark place, and thus is very useful as the packing material for storing expensive infusion solution such as the contrast medium which is radiological diagnostic solution.

13 Claims, 1 Drawing Sheet

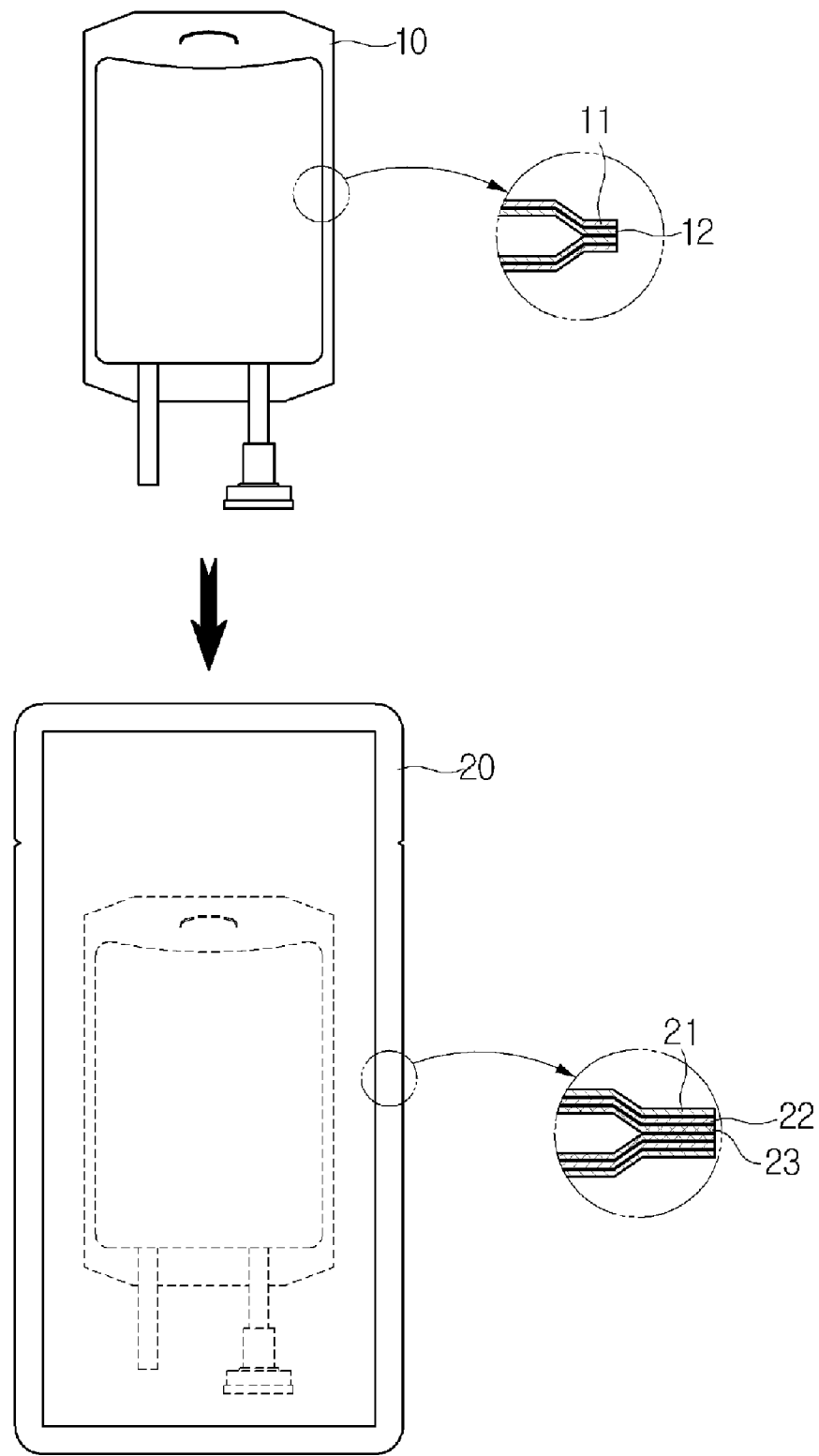
[Fig. 1]

DOUBLE PACKING MATERIALS FOR INFUSION SOLUTION

TECHNICAL FIELD

The present invention relates to double packing materials for infusion solution.

BACKGROUND ART

The present invention relates to double packing materials for infusion solution. More particularly, the present invention relates to double packing materials for infusion solution, in which the infusion solution is primarily packed by a polyethylene packing material and the packed polyethylene packing material is secondarily vacuum packed and hermetically sealed by a material including an aluminum foil, thereby improving preservation properties of the infusion solution.

In packing materials for infusion solution, a glass bottle with a rubber plug has been used widely, but the glass bottle with a rubber plug is disadvantages in handling in aspects of a falling dart impact strength or a weight thereof and is also breakable. Therefore, a package in a form of a bag using polymeric material are recently used in consideration of easy handling, distribution cost and easy disposal, and the representative example is polyvinyl chloride (PVC). The PVC has been widely used in early stage due to its lightness and smoothness, but the safety of the PVC bag has been continuously questioned since it contains a plasticizer DEHP which is a phthalate known as an environment hormone, emits toxic substances such as dioxin upon burning and shows reproductive toxicity in animal experimentation using on mice.

Accordingly, it has been suggested to be compulsory for medical instruments for medical treatment and specific persons including newborn babies, pregnant women and older persons to use a non-PVC product or a product containing no DEHP. According to this voluntary agreement, various non-PVC products have been developed, and polyethylene (PE), polyethylene terephthalate resin (PET) composite multilayer film and polypropylene (PP) are now used as a non-PVC package for infusion solution.

Particularly, the PE and the PET composite film are mainly used in Korea and it is not until now that the polypropylene with lightness, flexibility, transparence, chemical resistance and superior strength is developed as the packing material for infusion solution. However, the polyethylene is still not prepared as a packing material for a contrast medium which is much expensive compared to other infusion solution.

DISCLOSURE OF INVENTION

Technical Problem

While the packing material of polypropylene for infusion solution is smoother than glass bottle or PVE, the packing material of polypropylene for infusion solution has a problem that the packing material is torn or burst by a shock during long-term storage or distribution since it has weaker thermal resistance and strength than the conventional product. In addition, the packing material of polypropylene has a large risk of deterioration of the infusion solution when exposed to sunlight or other lights, or heat.

Technical Solution

The present inventor was completed the present invention from the finding that the thermal resistance of the infusion solution is largely increased and the preservation properties of the infusion solution is improved as tear of the packing by external force or deterioration by sunlight or other lights is prevented, by primarily packing the infusion solution with a polypropylene packing material and secondarily vacuum packing and hermetically sealing the packed polyethylene packing material with a material including an aluminum foil. Particularly, the present inventor intend the present invention to pack and distribute the expensive contrast medium, which is a radiological diagnostic drug by the aforementioned method, thereby improving the preservation properties of the contrast medium to protect the contrast medium from the risk of damage and deterioration.

Advantageous Effects

The double packing materials according to the present invention which primarily packs the infusion solution with a polypropylene packing material and secondarily vacuum packs and hermetically seals the packed polyethylene packing material with a material including an aluminum foil ensures safety of the content therein from light and has high thermal resistance and excellent preservation properties that resists to the damage and tearing by external force on long-term storage despite that it is not stored in dark place, and thus is very useful as the packing material for storing expensive infusion solution such as the contrast medium which is radiological diagnostic solution.

BRIEF DESCRIPTION OF THE DRAWINGS

FIG. 1 is a front view with a partial enlarged sectional view illustrating double packing materials for infusion solution according to a preferred embodiment of the present invention.

DESCRIPTION TO MAIN ELEMENTS

10: polypropylene packing material
11: outer layer
12: inner layer
20: packing material containing an aluminum foil
21: polyester
22: aluminum foil
23: polyethylene

BEST MODE FOR CARRYING OUT THE INVENTION

The present invention relates to double packing materials for infusion solution. Specifically, the present invention relates to double packing materials for infusion solution as shown in FIG. 1, in which the infusion solution is primarily packed by a polyethylene packing material 10 and the packed polyethylene packing material is secondarily vacuum packed and hermetically sealed by a material 20 including an aluminum foil, thereby improving preservation properties of the infusion solution.

The polyethylene packing material 10 that directly contains the infusion solution is male of polypropylene synthetic resin. The polypropylene synthetic resin is a material which is recently being developed as the material for infusion solution since it has no affection of environmental hormone and is non-toxic to human body. In the present invention, the polypropylene synthetic resin may be used as a polypropylene homopolymer or as a copolymer of propylene with alpha-olefin to enhance thermal resistance and transparency. Preferably, in order to enhance both transparency and flexibility of the resin, the polypropylene synthetic resin is prepared in a double-layer structure in which a multi-layer structure is possible without an additional adhesive resin for adhering an outer layer 11 and an inner layer 12.

Therefore, the polypropylene packing material 10 according to an embodiment of the present invention is prepared by adhering the outer layer 11 consisting of a polypropylene homopolymer, a copolymer of propylene with alpha-olefin or a mixture thereof; and the inner layer 12 consisting of 40-65 parts by weight of a polypropylene, 30-50 parts by weight of amorphous polypropylene resin and 1-15 parts by weight of hydrogenated styrene butadiene rubber, in the double-layer structure.

The transparency of the polypropylene material is at least 80%, preferably at least 85% and the flexibility is a flexural modulus of less than 300 kg/cm$^2$. Preferably, a melting point is 150-160° C. for the outer layer and 140-150° C. for the inner layer, and a melt index (230° C., 2.16 kg) is 0.50-10 g/10 min for the outer layer and 2.0-10/10 min for the inner layer.

In general, a medical packing material for infusion solution is sterilized at 121° C. after filled with the infusion solution and must have goal thermal resistance since de-formation and substance flowed out have to be lower than a regulated value. In addition, the infusion solution must have a goal transparency so as to readily confirm by eye whether the drug stored in the packing material is deteriorated or contaminated when using the medical infusion solution, and also have a goal flexibility so as to enhance ease of use and strength against stress.

Therefore, in an embodiment of the present invention, the hydrogenated styrene butadiene rubber is ailed to polymerization of the polypropylene synthetic resin, and the amorphous polypropylene having a degree of crystallinity of less than 30% is further added thereto, thereby increasing the transparency and flexibility of the resin.

Meanwhile, in the polymerization of the polypropylene synthetic resin, a resin layer having not only the thermal resistance but also increased flexibility and transparency is required since the more the content of the polypropylene resin is increased the more the flexibility is decreased and the more the content of the amorphous polypropylene resin is increased the more the thermal resistance is lowered. However, while the contents of the polypropylene resin and the amorphous polypropylene resin are determined to the aforementioned contents since workability is lowered due to adhesiveness when the amorphous polypropylene resin is used more than a pre-determined content, the contents of the compositions are not particularly limited thereto and may vary as the kind of the infusion solution and the storage period.

The aluminum foil-containing packing material 20 according to an embodiment of the present invention refers to a packing material of a multi-layer structure in which polyester and polyethylene cover the aluminum foil, and consists of a triple-layer structure of polyester 21, aluminum foil 22 and polyethylene 23. Also, the three-layer structured packing material is subject to thermal bonding of the edges thereof to contain the primarily packed polypropylene packing material and then subject to nitrogen charge and hermetical sealing in the form of a pouch. The packing method and the size of the packing may vary as size and capacity of the content.

The aluminum foil-containing packing material 20 prepared by the aforementioned method has an effect that it enables long-term safe storage of the infusion solution and minimizes the damage and deterioration of the content by external pressure and light during distribution.

In the present specification, the polyester refers all of the polymers having ester group as a connecting group and is largely used for a retort pouch since it has good strength and thermal resistance, and is also used for various uses such as a magnetic tape and a condenser other than the packing.

The aluminum foil is male by repeatedly rolling an industrial aluminum panel so that the aluminum panel becomes gradually thinner and finally putting the aluminum panel on a foil rolling mill, and has generally a thick of several μm. The aluminum foil has a damp proofing effect and is used for packing cookies and cigarettes or for cooking or decoration. In recent, it becomes possible for the aluminum foil to be stuck to a paper together or printed freely on the surface thereof and thus an amount of the aluminum foil used as a packing material is sharply increased.

In the present specification, the infusion solution includes all of various infusion solutions distributed as a medical solution including a saline solution, a dextrose solution, Hartman's solution, Ringer's solution, an amino acid solution and a diagnostic solution, and preferably a diagnostic solution, more preferably a contrast medium.

As described above, the double packing materials for infusion solution has the double sealing structure of the polypropylene packing material and the aluminum foil-containing packing material for packing the polypropylene packing material and the aluminum foil-containing packing material has the triple structure of the PET 21, the aluminum foil 22 and the PE 23. Therefore, it is possible to lengthen the preservation period of the content to a long time of more than 2 years and thus safely store the contents during the storage and distribution period of the infusion solution.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. Double packing materials for packing an infusion solution, comprising:
a primary polypropylene packing material for primarily packing the infusion solution, wherein the primary polypropylene packing material has a double-layer structure consisting of an outer layer and an inner layer, the outer layer consisting of a polypropylene homopolymer, a copolymer of propylene with alpha-olefin, or a mixture thereof, and the inner layer consisting of 40-65 parts by weight of a polypropylene, 30-50 parts by weight of amorphous polypropylene resin and 1-15 parts by weight of hydrogenated styrene butadiene rubber; and
a secondary packing material comprising an aluminum foil for packing the primary polypropylene packing material.

2. The double packing material according to claim 1, wherein the secondary packing material includes a triple-layer structure of polyester, aluminum foil and polyethylene.

3. The double packing material according to claim 1, wherein the infusion solution packed in the polypropylene packing material is a diagnostic solution.

4. The double packing material according to claim 3, wherein the diagnostic solution is a contrast medium.

5. A medical solution packed by the double packing material according to claim 1.

6. A medical solution packed by the double packing material according to claim 2.

7. A medical solution packed by the double packing material according to claim 3.

8. A medical solution packed by the double packing material according to claim 4.

9. The double packing material according to claim 1, wherein a melting point of the outer layer of the polypropylene packing material is about 150° C. to about 160° C.

10. The double packing material according to claim 1, wherein a melting point of the inner layer of the polypropylene packing material is about 140° C. to about 150° C.

11. The double packing material according to claim 1, wherein the amorphous polypropylene resin has a degree of crystallinity of less than 30%.

12. The double packing material according to claim 2, wherein the triple layer structure of the secondary packing material consists of an inner layer of polyester, a middle layer of aluminum foil and an outer layer of polyethylene.

13. Double packing materials for packing an infusion solution, comprising:

a primary packing material for packing the infusion solution, wherein the primary packing material has a double-layer structure consisting of an outer layer and an inner layer, the outer layer consisting of a polypropylene homopolymer, a copolymer of propylene with alpha-olefin, or a mixture thereof, and the inner layer consisting of 40-65 parts by weight of a polypropylene, 30-50 parts by weight of amorphous polypropylene resin having a degree of crystallinity of less than 30%, and 1-15 parts by weight of hydrogenated styrene butadiene rubber; and a secondary packing material for packing the primary packing material, wherein the secondary packing material has a triple layer structure consisting of an inner layer of polyester, a middle layer of aluminum foil and an outer layer of polyethylene.

* * * * *